US008615595B2

(12) United States Patent
McCollom et al.

(10) Patent No.: US 8,615,595 B2
(45) Date of Patent: Dec. 24, 2013

(54) AUTOMATIC PROTOCOL SWITCHING

(75) Inventors: William G. McCollom, Fort Collins, CO (US); Michael J. Barber, Cheyenne, WY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1234 days.

(21) Appl. No.: 11/669,654

(22) Filed: Jan. 31, 2007

(65) Prior Publication Data

US 2008/0184333 A1 Jul. 31, 2008

(51) Int. Cl.
*G06F 15/16* (2006.01)
*G06F 15/173* (2006.01)
*G06F 7/04* (2006.01)
*H04J 14/08* (2006.01)

(52) U.S. Cl.
USPC ........... 709/230; 709/203; 709/218; 709/219; 709/225; 398/99; 726/27

(58) Field of Classification Search
USPC ...................................... 709/203; 726/14–15
See application file for complete search history.

(56) References Cited

U.S. PATENT DOCUMENTS

| | | | | |
|---|---|---|---|---|
| 6,477,573 | B1 * | 11/2002 | Lea | 709/224 |
| 6,507,867 | B1 * | 1/2003 | Holland et al. | 709/219 |
| 2002/0083120 | A1 * | 6/2002 | Soltis | 709/200 |
| 2004/0024921 | A1 | 2/2004 | Peake | |
| 2004/0057424 | A1 * | 3/2004 | Kokkonen | 370/352 |
| 2004/0133634 | A1 * | 7/2004 | Luke et al. | 709/203 |
| 2005/0114647 | A1 * | 5/2005 | Epstein | 713/153 |
| 2005/0120037 | A1 | 6/2005 | Maruyama | |
| 2005/0149508 | A1 * | 7/2005 | Deshpande | 707/3 |
| 2006/0094456 | A1 | 5/2006 | Rittle et al. | |
| 2006/0200570 | A1 | 7/2006 | Stirbu et al. | |
| 2006/0206484 | A1 * | 9/2006 | Hara | 707/8 |
| 2006/0212535 | A1 * | 9/2006 | Sutardja | 709/217 |
| 2007/0011413 | A1 | 1/2007 | Nonaka | |
| 2007/0058670 | A1 * | 3/2007 | Konduru et al. | 370/466 |
| 2008/0184333 | A1 * | 7/2008 | McCollom et al. | 726/1 |

FOREIGN PATENT DOCUMENTS

JP 11-249815 9/1999

OTHER PUBLICATIONS

International Search Report dated Jun. 25, 2008.
Japan Patent Office, Office Action dated Jul. 26, 2011, App No. 2009-548296, PCT/US2008/001271, International Filing Date Jan. 30, 2008.
Jose M Sanchez Santana et al: "UPNP Service Discovery for Heterogeneous Networks"; Personal, Indoor and Mobile Radio Communications; 2006 IEEE 17TH International Symposium on, IEEE, PI, Sep. 1, 2006, pp. 1-5, XP031023564.
European Patent Office Supplementary European Search Report Application No. EP 08 72 4989.

* cited by examiner

*Primary Examiner* — Scott Christensen
*Assistant Examiner* — Farrukh Hussain

(57) ABSTRACT

A method comprises automatically determining whether a network device is local or remote to a client access device. If the network device is local to the client access device, the method comprises using a first access protocol to access the network device. If the network device is remote to the client access device, the method comprises using a second access protocol to access the network device.

7 Claims, 4 Drawing Sheets

| NAS DEVICE | LOCAL IP ADDRESS | LOCAL NAME | REMOTE IP ADDRESS | REMOTE NAME |
|---|---|---|---|---|
| NAS 1 | | | | |
| NAS 2 | | | | |
| ... | | | | |
| NAS n | | | | |

AUTOMATIC PROTOCOL SWITCHING

BACKGROUND

Some types of network devices (e.g., network attached storage devices) are accessible using any one or more of multiple access protocols. The particular access protocol used may depend on whether the client device attempting to access the network device is local or remote to the network device. For example, an access protocol such as the Network File System (NFS) may be appropriate if the client device and the target network device are connected to the same subnet or local area network (LAN). On the other hand, if the client device and the target network device are remotely located from each other, for example, via a network portal, then a different access protocol such as a web page protocol may be needed for the client device to access the network device. Having to know which access protocol to use and configuring the client computer accordingly imposes a burden on the user of the client device.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
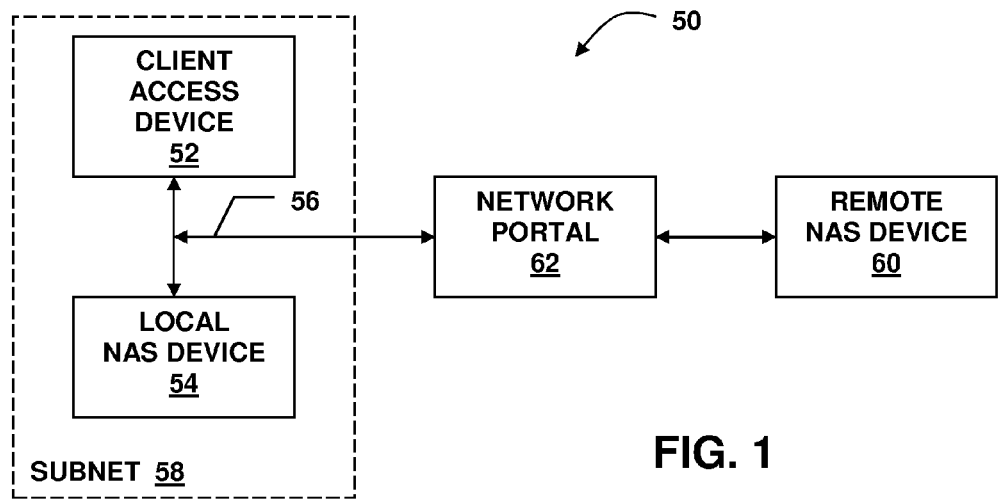
FIG. 1 shows a system in accordance with embodiments of the invention.

FIG. 1 illustrates a system 50 comprising a client access device (e.g., a computer) 52 coupled to a network 56. The client access device 52 can access a network device such as a network attached storage (NAS) device whether the target NAS device is local or remote to the client access device 52. NAS device 54 is illustrated connected to the same local area network (LAN) or subnet as the client access device 52 and is thus considered local to the client access device. NAS device 60 is accessible to the client access device 52 via a network portal 62 which comprises one or more routers, firewalls, etc. and thus NAS device 60 considered remote from the client access device 52. In at least some embodiments, the NAS device 54 is local to the client access device 52 if the devices are on the subnet, whereas the devices are remote from each other if the device are not on the same subnet thereby requiring routing. Multiple NAS devices (i.e., one or more local NAS devices 54 and/or one or more remote NAS devices) may be available to the client access device 52, and a user of the client access device can select from any of such multiple NAS devices. In some embodiments, only a single NAS device is available and may be either local or remote to the client access device. The embodiments described below refer to the network device as a NAS device, but in other embodiments, the network device may be a device other than a storage device.

Figure 2:
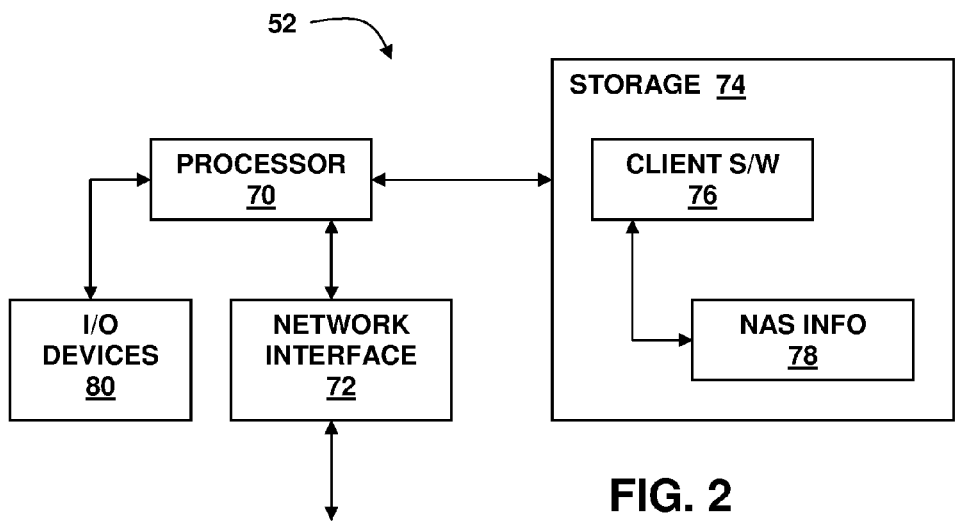
FIG. 2 shows a client access device in accordance with embodiments of the invention.

The client access device 52 may comprise a computer or other type of access device. FIG. 2 illustrates an embodiment of the client access device 52. As shown, the client access device 52 comprises a processor 70 coupled to a network interface 72, storage 74, and one or more input/output (I/O) devices 80. The I/O devices 80 comprise any one or more of a display, a mouse, a keyboard, or other type of input or output device. The storage 74 comprises a computer-readable medium and, more particularly, any suitable form of volatile memory (e.g., random access memory), non-volatile storage (e.g., hard disk drive, Flash memory, etc.), and combinations thereof. Through the network interface 72, the client access device 52 connects to a local area network 56 and to the network portal 62 (FIG. 1).

The processor 70 executes software, such as client software 76 stored on the storage 74. The client software 76 causes the processor 70 to perform some or all of the functionality described herein attributed to the client access device 52. Storage 74 also contains NAS information 78 which is used by the client software 76/processor 70 to determine whether a desired NAS device is local or remote with respect to the client access device 52, as will be explained below.

In accordance with embodiments of the invention, a user of the client access device 52 selects a desired network device (e.g., a NAS device) to access. In some embodiments, a graphical depiction (e.g., an icon) is shown on a display of the client access device 52 representative of each network device from which the user can choose. The user selects (e.g., "clicks") the desired network device. The client access device 52 automatically determines an appropriate access protocol to use to access the target NAS device based on whether the NAS device is local to or remote from the client access device.

Figures 3, 4:
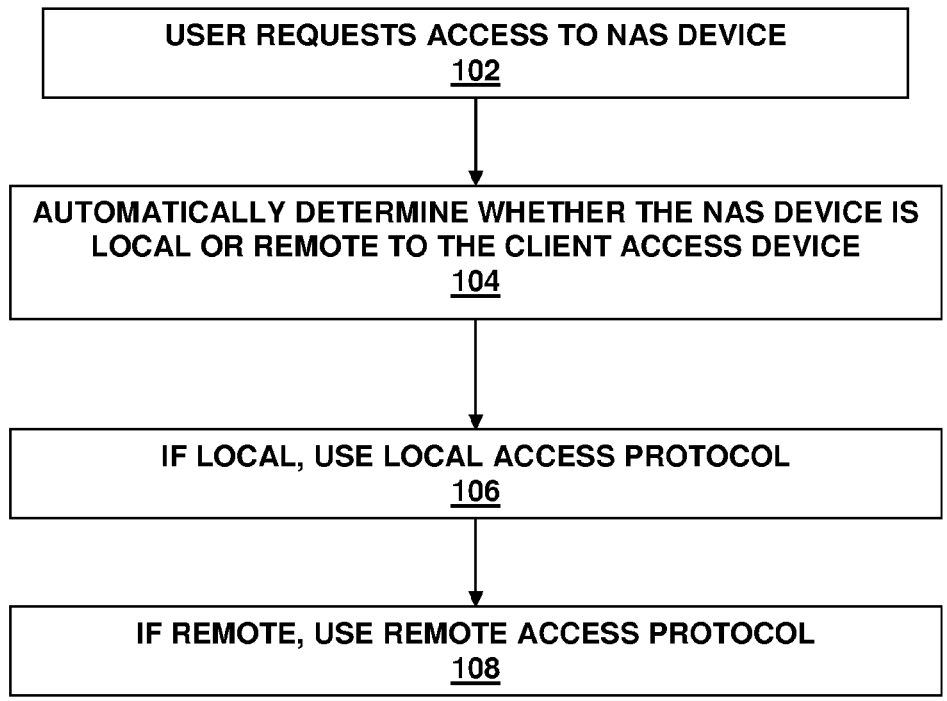
FIG. 3 illustrates a method in accordance with embodiments of the invention.
FIG. 4 shows illustrates a network attached storage device information in accordance with embodiments of the invention.

FIG. 3 illustrates a method 100 in which the user requests access to a NAS device (102). At 104, the client access device automatically determines whether the NAS device is local to or remote from the client access device. At 106, if the NAS device is local to the client access device, a local access protocol is implemented by the client access device to access the local NAS device. Alternatively, at 108, if the NAS device is determined to be remote from the client access device, a remote access protocol is implemented by the client access device to access the local NAS device. The order of the actions in FIG. 3 can be varied from that shown.

In various embodiments, the local access protocol is different from the remote access protocol, although in some embodiments the access protocols could be the same. In the context of a NAS device, the access protocol implemented by the client access device 52 comprises a protocol by which the client access device 52 communicates with the NAS device for read and write operations. A local access protocol may comprise a LAN-based access protocol such as Network File System (NFS) or Server Message Block (SMB). A remote access protocol may comprise a web page protocol or File Transfer Protocol (FTP). Examples of web page protocols comprise Hyper-Text Transport Protocol (HTTP), Extensible Markup Language (XML), and Simple Object Access Protocol (SOAP).

FIG. 4 illustrates an embodiment of the NAS information 78 stored on the client access device 52. For each of potentially multiple NAS devices, two local network device identifiers and two remote network device identifiers are provided. Different or additional identifiers can be provided, and the number of identifiers can be different than that shown in the illustrative embodiment of FIG. 4. Some or all of the local identifiers may be different from the remote identifiers. The local identifiers are provided in the example of FIG. 4 as a local Internet Protocol (IP) address and a local name. Similarly, the remote identifiers are provided as a remote IP address and a remote name. Each of the local identifiers is used to access a NAS device in its local environment (e.g., within a LAN or subnet). A local identifier of a NAS device is not usable by a client access device to which that NAS device is not local. Each of the remote identifiers is usable by a client access device 52 to access a NAS device that is remote from the client access device. As such, whether a client access device 52 uses a local or a remote identifier to access a NAS device depends on whether the target NAS device is local or remote from the given client access device.

Figure 5:
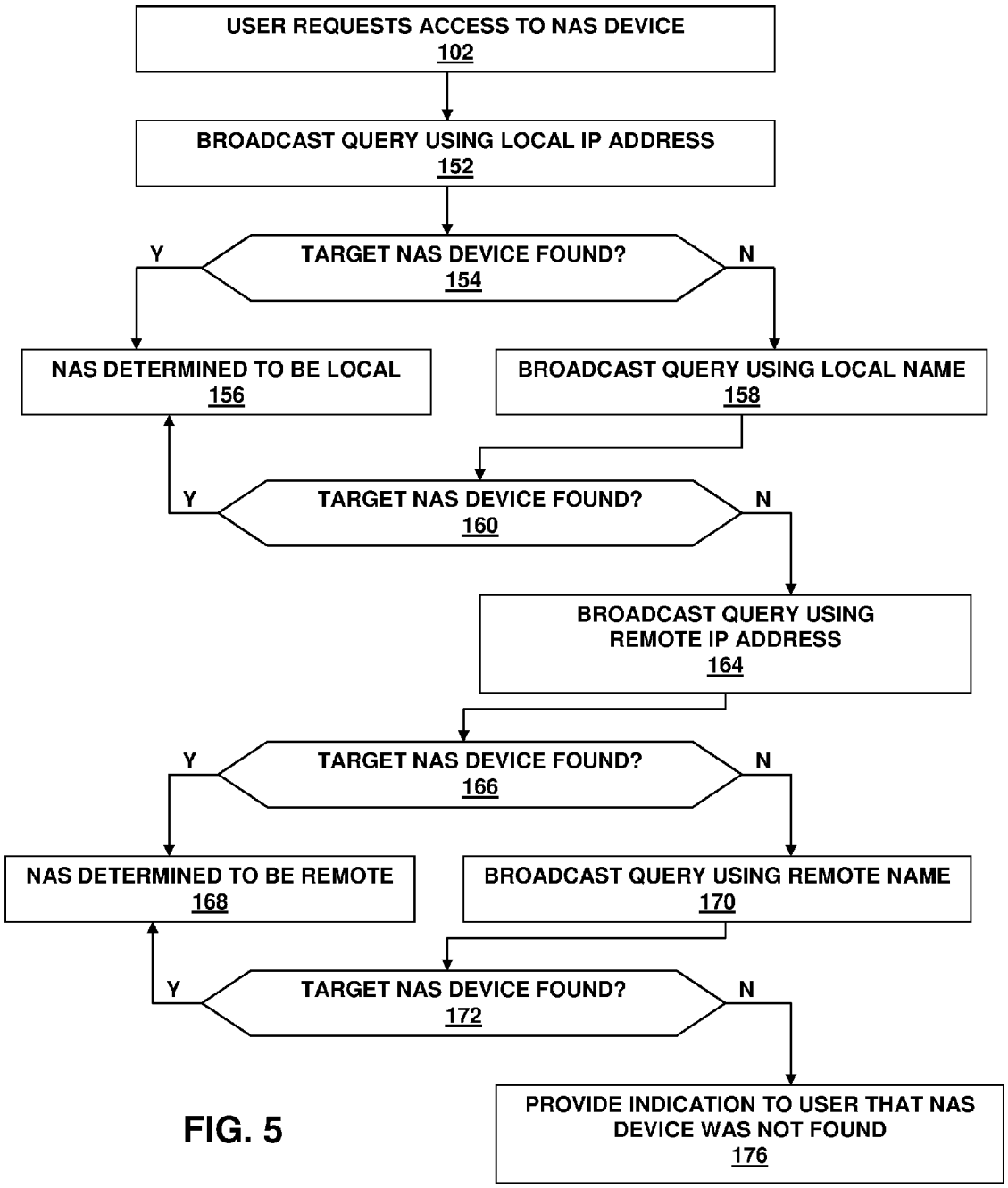
FIG. 5 is an illustrative embodiment of the method of FIG. 4.

FIG. 5 illustrates an illustrative implementation of how the client access device determines whether the target NAS device is local or remote from that particular client access device. After a user requests (102) access to a NAS device, the client access device 52 broadcasts (e.g., transmits) a query using the target NAS device's local IP address (as obtained from NAS information 78). The query comprises a message that targets the local IP address. At decision 154, the client access device 52 determines whether the target NAS device is present based on the query. If a device corresponding to that particular IP address is present and operational, that device will respond to the query thereby providing a response message back to the client access device 52. If no device corresponding to the local IP address is present and operational, no response message will be received by the client access device (e.g., as determined upon expiration of a timeout period of time). Even if a device corresponding to the target local IP address is present and operational, that device may or may not be the target NAS device. If the true target NAS device provides the response message, the response comprises a credential (e.g., a password, a key, etc.), a copy of which is also pre-stored in the client access device 52. The client access device 52 compares the credentials to authenticate the NAS device. If the credentials match, then at 156 the client access device 52 determines that the target NAS device has been found and a suitable access protocol is then used. If the target NAS device is found by the client access device, the client access device 52 permits the user to access the NAS device (e.g., to perform file operations such as viewing, deleting, copying, editing, etc.).

If the target NAS device is not found based on the query using the local IP address for the target NAS device, the client access device 52 then broadcasts (158) another query using the NAS device's local name. A naming service (provided by, for example, a router or by a naming service on the network) maps the local name to the local IP address. A similar process to that described above occurs at 160 to determine whether the target NAS is found. If the target NAS device is found (based on a response from a query that used the local name and a verification of a credential in the response), then at 156 the NAS device is determined to be local. If, after using the local identifiers (local IP address and local name), the target NAS device is not found, then the client access device 52 determines that the target NAS device is not present local to the client access device. Instead, if the target NAS device is on and operational, the client access device determines the target NAS device to be remote from the client access device. Actions 164-172 are performed to determine whether the target NAS device in fact is remote.

At 164, the client access device broadcasts a query using the remote IP address for the NAS device. If the target NAS device is found at 166 (a response with a proper credential is received by the client access device), then the target NAS device is determined to be remote and a suitable access protocol is used. If the target NAS device is not found based on the remote IP address, then at 170, the client access device 52 broadcasts a query using the NAS device's remote name. A name-to-IP address conversion service (e.g., Domain Name System) converts the remote name to a corresponding remote IP address. At 172, if a suitable response is received (having the correct credential), the target NAS device is found and determined to be remote (168).

If the target NAS device is determined to be neither local nor remote (e.g., the target NAS device is powered off or otherwise unavailable to the client access device), then at 176, the client access device 52 provides an indication to the user that the NAS device was not found. The indication may be in visual or audible form. In some embodiments, the indication comprises an error message.

Figure 6:
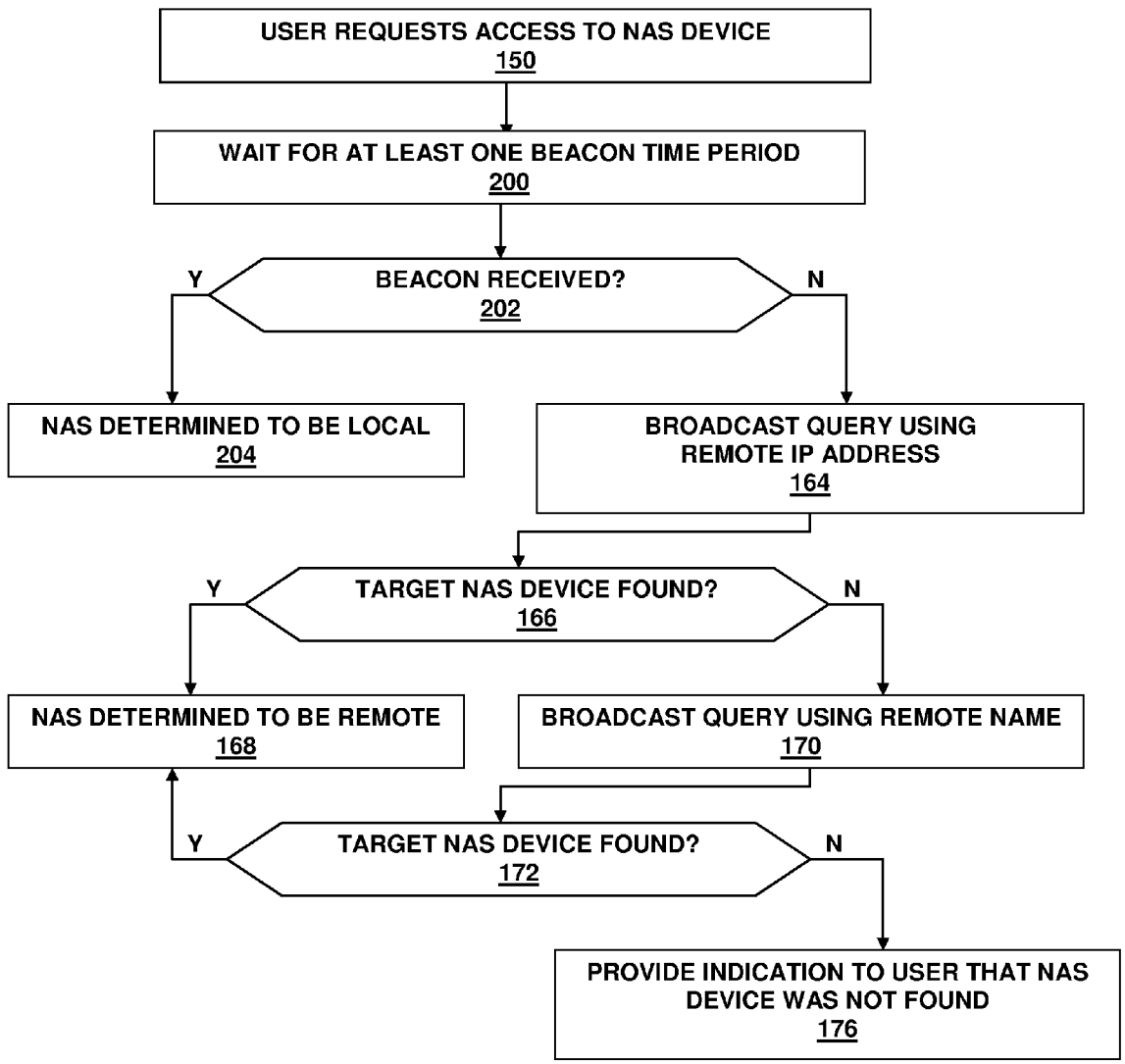
FIG. 6 is yet another illustrative embodiment of the method of FIG. 4.

FIG. 6 illustrates an alternative embodiment. In this embodiment, each NAS device emits a beacon signal at periodic intervals (the "beacon time period"). The beacon signals from a NAS device are only broadcast within that NAS device's local environment. Each beacon signal comprises a message that is multicast to a plurality of IP addresses. The message signifies that the NAS device is operational and contains the local IP address and/or local name of that NAS device. The beacon message may also comprise a credential for that NAS device.

Referring still to FIG. 6, after the user requests (150) access to a particular NAS device, the client access device 52 waits (at 200) for at least one beacon time period for a beacon signal. If a beacon signal is received and the credential authenticated, the client access device 52 determines that the target NAS device is local and uses the corresponding access protocol (204). If a beacon signal from the target NAS device is not received by the client access device within the beacon time period, then the client access device determines that the target NAS device is not local. Actions 164-172 are performed as described above to determine whether the target NAS device is remote. At 176, the client access device provides an indication to the user if the user if the target NAS device is not found at all.

The order of the actions in FIGS. 5 and 6 can be varied from that shown. For example, rather than determining whether the target NAS device is local and then whether the device is remote can be performed in the reverse order. That is, the client access device first determine can whether the target NAS device is remote and then whether the NAS device is local. Further still, rather than using broadcasting a query using an IP address before broadcasting query using a name, the queries may be performed in the opposite order (i.e., name-based query before IP address-based query).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   automatically determining whether a network device is local or remote to a client access device by:
   broadcasting a first query containing an internet protocol (IP) address of the network device and,
   based on a result of the first query indicating the network device is not found,
   determining whether the device is one of local, remote, or not found by broadcasting a second query containing a name of the network device;
   based on said network device being local to said client access device, using a first access protocol to access said network device; and
   based on said network device being remote to said client access device, using a second access protocol to access said network device.

2. The method of claim 1 wherein automatically determining whether a network device is local or remote to the client access device further comprises broadcasting a third query for the network device across a network portal using a first remote network device identifier if the network device is determined not be local to the client access device.

3. The method of claim 2 wherein automatically determining whether a network device is local or remote to the client access device further comprises broadcasting a fourth query for the network device across the network portal using a second remote network device identifier if no response is received from the third query.

4. A system, comprising:
   a network interface;
   a processor coupled to the network interface, said processor automatically determines whether a network device is local or remote to the system, implements a local access protocol based on the network device being local to the system and implements a remote access protocol based on the network device being remote to the system;
   wherein said processor determines whether the network device is local by broadcasting a first query containing an internet protocol (IP) address of the network device;
   wherein, based on a result of the first query indicating the network device is not found, said processor determines whether the network device is one of local, remote, or not found by broadcasting a second query containing a name of the network device.

5. The system of claim 4 wherein the remote access protocol comprises a protocol selected from a group consisting of a web page protocol and a file transfer protocol (FTP).

6. The system of claim 4 wherein the local access protocol comprises a protocol selected from a group consisting of SMB and NFS.

7. A non-transitory computer-readable storage medium comprising software that, when executed by a processor, causes the processor to:
   automatically determine whether a network device is local or remote to a client access device by:
   broadcasting a first query containing an internet protocol (IP) address of the network device and,
   based on a result of the first query indicating the network device is not found,
   determining whether the device is one of local, remote, or not found by broadcasting a second query containing a name of the network device;
   based on said network device being local to said client access device, using a first access protocol to access said network device; and
   based on said network device being remote to said client access device, using a second access protocol to access said network device.

* * * * *